Sept. 20, 1960 G. A. HOLCOMB ET AL 2,953,331
AIRCRAFT EMERGENCY ESCAPE SYSTEM
Filed Dec. 5, 1957 3 Sheets-Sheet 1

INVENTORS
GALEN A. HOLCOMB
JOHN B. MORRIS
DEAN E. HOTHAM
BY
ATTORNEY

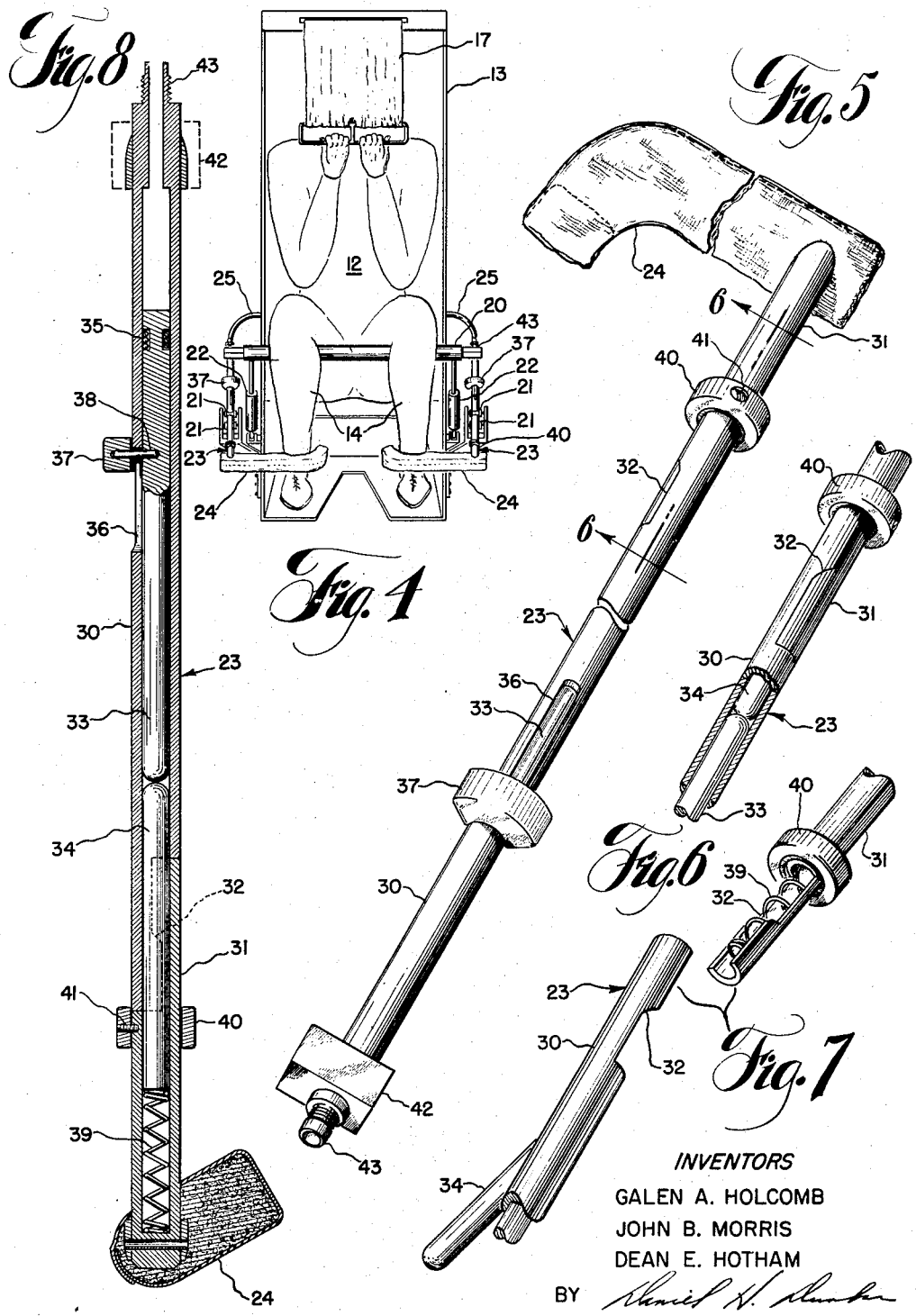

Sept. 20, 1960 G. A. HOLCOMB ET AL 2,953,331
AIRCRAFT EMERGENCY ESCAPE SYSTEM
Filed Dec. 5, 1957 3 Sheets-Sheet 3
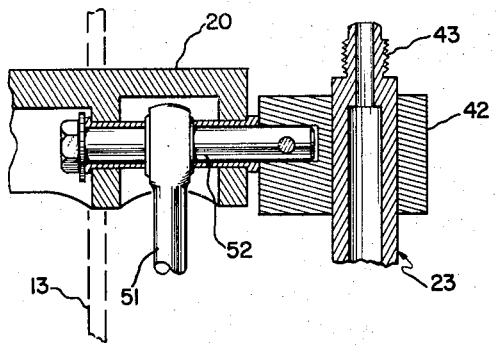
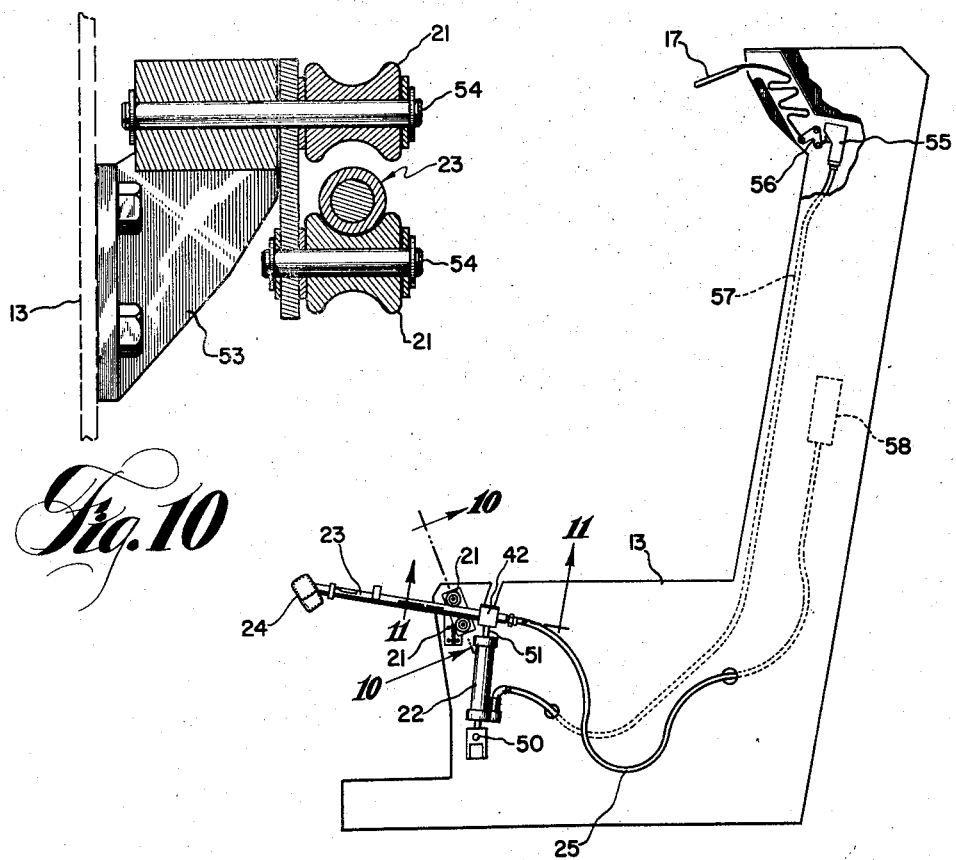
INVENTORS
GALEN A. HOLCOMB
JOHN B. MORRIS
DEAN E. HOTHAM
BY
ATTORNEY United States Patent Office 2,953,331
Patented Sept. 20, 1960

2,953,331

AIRCRAFT EMERGENCY ESCAPE SYSTEM

Galen A. Holcomb, Columbus, John B. Morris, Reynoldsburg, and Dean E. Hotham, Columbus, Ohio, assignors to North American Aviation, Inc.

Filed Dec. 5, 1957, Ser. No. 700,845

7 Claims. (Cl. 244—122)

This invention relates generally to an emergency escape system and pertains more particularly to a method of positioning the legs of an aircraft pilot during an emergency escape sequence which utilizes a catapulted ejection seat. This invention also contemplates the utilization of improved apparatus to effectuate the leg positioning and leg releasing phases of an ejection seat emergency escape sequence.

Important problems have been encountered in providing pilot escape capability in modern high-performance aircraft, and because of the large forces and high-magnitude accelerations required for successful pilot ejection, extreme care must be taken to properly position the pilot preparatory to and during ejection. Such care is necessary to minimize adverse body stresses and thus increase the likelihood of pilot survival. Also, provision must be made within the apparatus utilized to properly release the pilot from restraint so that he may be readily separated from the ejection seat prior to parachute deployment.

Particular difficulty has been encountered with proper positioning of a pilot's legs prior to and during initial emergency movement of an aircraft ejection seat. Such limb portions must adequately clear those features of the aircraft structure which are typically located immediately adjacent the pilot, and because of the need for extreme rapidity, reliability of escape cannot be predicated entirely upon pilot effort. To accomplish proper leg positioning during the emergency sequence, this invention utilizes a method and apparatus which first raises the knee portion of each leg by contact with the underside thereof and simultaneously withdraws the foot portion of each leg by said knee-raising and by engagement of a padded retractor arm hook with the upper side of each leg in the general area of the ankle portion thereof. The leg positioning sequence is accomplished rapidly and in a manner whereby only relatively slight pressure contact is made between the retractor arm hook portion and the pilot's leg. Also, the apparatus is provided with means for quickly releasing each leg member from restraint by the retracting device at such time that it is desired the legs be freed. This latter freeing action may be effected manually by the pilot or automatically prior to separation of the pilot from the seat.

Accordingly, it is an object of this invention to provide a method of pilot limb positioning for use during an ejection seat emergency escape sequence whereby such limb members may be effectively mechanically positioned so as to not make contact with otherwise obstructing portions of an aircraft.

Another object of this invention is to provide a method for properly positioning a pilot's legs during an emergency escape sequence with extreme rapidity.

Another object of this invention is to provide an apparatus for mechanically positioning a pilot's legs during an emergency escape sequence from a catapulted ejection seat in a manner whereby a minimum of physical contact is made between each leg and the positioning apparatus.

Another object of this invention is to provide a method for rapidly positioning a pilot's legs during an emergency escape from an aircraft in a manner whereby the so-positioned legs are finally properly positioned to minimize such ejection body stresses as will be associated therewith.

Another object of this invention is to provide an apparatus which will adequately and properly restrain an ejected aircraft pilot's body leg portions throughout preselected phases of an emergency escape sequence.

A still further object of this invention is to provide a leg positioning apparatus which may be actuated to efficiently release a pilot's body leg portion from restraint thereby, either automatically at a pre-selected instance or manually by pilot-applied effort.

Another object of this invention is to provide a limb positioning apparatus for use in an ejection seat emergency escape which has a high degree of operational reliability, which is compact yet relatively free of maintenance complexities, and which is relatively simple to manufacture.

Other objects and advantages of the present invention will become more apparent during consideration of the following description, particularly when taken in connection with the accompanying drawings.

In the drawings, wherein like numerals are employed to designate like parts throughout the same:

Fig. 4 is a front elevational view of the pilot and ejection seat shown in Figs. 2 and 3;

Fig. 5 is a perspective view of a preferred form of leg retractor arm which may be utilized in the practice of this invention;

Fig. 6 is a perspective sectional view of a portion of the Fig. 5 retractor arm taken along the line 6—6 of Fig. 5 and showing the relation of various of its components prior to a release operation;

Fig. 7 is an exploded perspective view of the retractor arm portion of Fig. 6 showing the relation of various of its components after completion of a release operation;

Fig. 8 is a sectional view of the retractor arm illustrated in Fig. 5; and

Figs. 9 through 11 illustrate portions of the ejection seat shown in Figs. 1 through 4.

Figure 1:
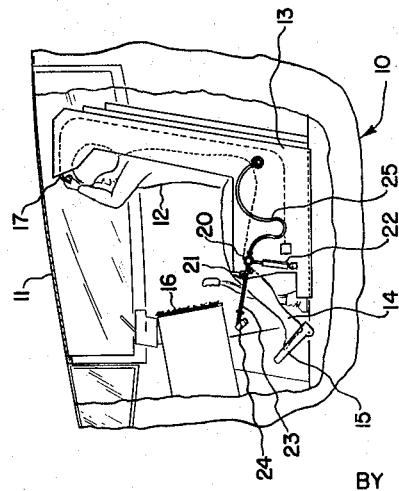

In Fig. 1 an aircraft fuselage portion 10 is shown with portions of its outer surface removed to disclose an interior cockpit enclosed by removable transparent canopy 11. Contained within the cockpit enclosure is a pilot 12 positioned in ejection seat 13 and having the leg portions 14 of his body extended outwardly so that his feet make contact with rudder pedals 15. As noted therein, legs 14 extend outwardly under the instrument panel portion 16 of the aircraft's structure.

It is typically required with respect to modern high-speed, high-performance aircraft that in an emergency situation the pilot be ejected therefrom with great rapidity. For instance, the arrangement of Figs. 1 through 3 provides a capability such that the pilot 12 and ejection seat 13 may be catapulted free of surrounding aircraft structure and into its air stream within 0.56 second from the time an emergency escape sequence is initiated.

Figure 3:
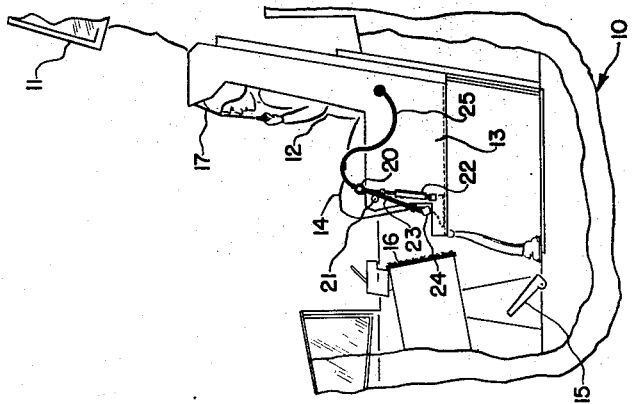
Figs. 1 through 3 are side elevational views which illustrate various positions of a pilot and ejection seat during an emergency escape sequence from a high-performance aircraft, and which further illustrate portions of the method and apparatus utilized in the practice of this invention.
Figure 2:
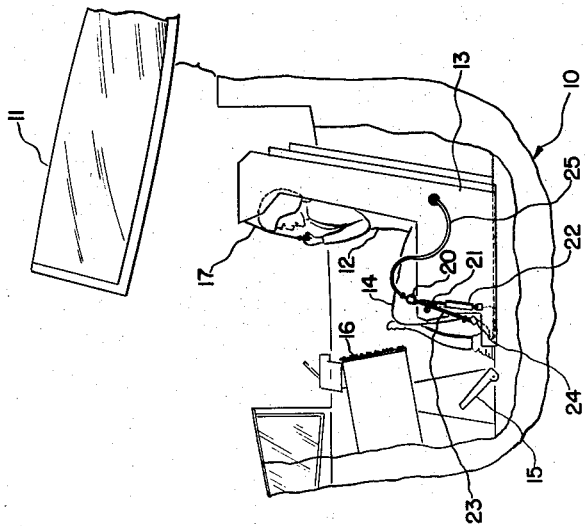

Also, it may be typically required that legs 14 be properly positioned with respect to the pilot 12 and ejection seat 13 (as shown in Figs. 2 and 3) within an elapsed time period of as little as 0.20 second from the escape sequence initiation point. This objective may be accomplished by legs 14 being moved upwardly and rearwardly in accordance with the teachings of this invention and through utilization of the apparatus described herein.

The apparatus for positioning legs 14 is shown in Figs. 1 through 3 as being essentially comprised of: a transverse support tube 20 which is located beneath each leg 14 of pilot 12 adjacent the underside of the knee portions thereof and which moves the leg knee portion upwardly; retracting arms 23 which engage the ankle region of each leg member 14 and which assist in moving such legs rearwardly with respect to seat 13; and actuators 22 which power and cause movement of tube 20 and retractor arms 23.

Each actuator 22 is attached to ejection seat 13 by pivot means 50 (Fig. 9), and the extendible rod portion 51 thereof is attached to support tube 20 and retractor arm 23 by pivot fastener means 52. An actuator means having a buffering action such as that shown in U.S. Letters Patent 2,815,008 is preferred. Arms 23 extend forward from the boss 42 where they are attached to the rod portion 51 of actuators 22 and are guided by, and additionally pivoted-about, the roller guides 21 attached to seat 13 through bracket 53 and pin-like fastener means 54. One extreme of each retractor 23 is provided with a hook portion 24 which engages the pilot's leg 14 generally in the region of the ankle. Flexible tubes 25, for conducting high pressure gas, are connected to the opposite end of each retractor arm 23 for reasons to hereinafter be noted.

As shown in Fig. 1, the emergency sequence may be initiated by pilot 12 exerting a pulling force on the ring handles which are secured to a face curtain 17 and which are located just above his head. At the instance of initiation, canopy 11 is released and is subsequently immediately removed, as by the means described in U.S. Letters Patent 2,832,553 assigned to the assignee of this application, from over the cockpit enclosure; the feet portion of legs 14 are generally positioned on rudder pedals 15 at the time of sequence initiation. Upon initiation of the escape sequence a pyrotechnic device 55 of Fig. 9 is fired through the bell crank 56 connected to curtain means 17, and the pressurized gases derived therefrom are ported to each actuator 22 by tube means 57, and as the rod portion thereof is extended, support tube 20 is moved upwardly to raise the knee portion of each leg 14. Simultaneously therewith each retractor arm 23 is pivoted about roller guides 21 so as to bring hook 24 into engagement with the rearwardly moving ankle portion of the properly associated leg 14.

It is preferred that the kinetics of the linkage be so arranged that minimum physical contact of hook 24 with leg ankle portion be established during positioning of the legs. This is accomplished by effecting immediate lifting of the knees so as to move the ankle portion of each leg substantially the full distance rearwardly before each hook 24 makes maximum contact with a leg 14. Utilization of support tube 20 or its mechanical equivalent, is essential to this invention.

Fig. 2 illustrates the position of various portions of the body of pilot 12 before seat 13 is catapulted from aircraft 10. As previously noted, this position may be attained within 0.20 second from the position illustrated in Fig. 1 and it is accomplished through utilization of the linkage and method features hereinbefore described.

Fig. 3 illustrates the positioning of pilot 12 and ejection seat 13 during the catapult stroke.

Release features of retractor arm 23 are detailed in Figs. 5 through 8. As illustrated therein the retractor arm 23 is preferably comprised of a tubular upper barrel portion 30 and tubular lower barrel portion 31 which cooperates with portion 30 at the over-center lap joint lock designated as 32. A reciprocal piston 33 is located interiorly of barrel portion 30 and a reciprocal solid center retention pin 34 is provided interiorly of barrel portions 30 and 31 and in abutting relation to piston 33. An elongated slot 36 is provided in the upper surface of barrel portion 30 and a stud 38 passes therethrough from knob 37 and into piston 33. Compression spring 39 normally maintains pin 34, piston 33, stud 38, and knob 37 in the position shown in Fig. 8. The so-assembled retractor arm components maintain the device in a rigid state because of the inter-cooperation between each over-center lap joint lock 32 and pin 34 which extends interiorly of each of barrel portions 30 and 31 and to each side of the region of lap joint lock 32. To provide for non-binding release of components 30 and 31 it may be desired to remove material from the interior edge of the over-center lock portion located at the end of each such barrel portion.

When it is desired to release the pilot's leg portions 14 from restraint by retractor arm 23 and attached hook 24, it is only necessary to move pin 34 downwardly from the position shown in Fig. 8 a sufficient distance whereby barrel portions 30 and 31 are caused to become disengaged in the region of joint 32. This may be accomplished either by porting high-pressure gases from a separate pyrotechnic device 58 through fitting 43 and tube means 25 into the interior of barrel portion 30, or by exerting a downward manual force on knob 37 and stud 38. Use of pressure seals 35 with piston 33 establishes a pressure-tight relation between piston 33 and barrel portion 30 but does not prevent reciprocal movement of piston 33 within the retractor arm 23. Either pressurized gas or pilot effort may thus be utilized to move center pin 34 downwardly the required distance to separate portions 30 and 31 of the apparatus.

Collar 40, which is attached to lower barrel portion 31 with a set screw 41, overhangs barrel portion 30 slightly and is provided to control proper orientation of barrel portion 31 with respect to barrel portion 30 during their separation. With reference to Fig. 8, barrel portion 31 is permitted to rotate only in a clockwise manner and thus provides only for release of the pilot leg portion 14 during such motion. Boss 42 is provided for use with pin means 52 to pivotally attach retractor arm 23 to support tube 20 or to the rod portion of an actuator 22.

It should be noted that the inter-cooperation between slot 36 and stud 38 limits downward movement of piston 34 and thereby acts to conserve such pressurized gas as may be utilized for its motivation. By this arrangement the very same gas charge can be further utilized to actuate other devices or mechanisms provided in association with the ejection seat. By way of example, the same pressurized gas can be utilized to subsequently release a body harness as typically provided to restrain the upper portions of the body of pilot 12 in seat 13, or to inflate a separation bladder provided to move the pilot apart from seat 13 during or prior to parachute deployment. See U.S. Patent No. 2,845,676 (filed April 15, 1954) and British Patent No. 709,490, respectively, for teachings of gas-actuated body harness release means and gas-actuated separation bladder means.

Fig. 7 illustrates portions of components of retractor arm 23 in their separated relation. Upper barrel portion 30 will remain attached to its motivating linkage and to ejection seat 13. However, lower barrel portion 31, the hook 24 which is attached thereto, spring 39, and center pin 34 are expended during the escape sequence. Replacement of such components is required to restore seat 13 and the attached leg positioning apparatus to an operating condition.

When the escape sequence is initiated the pilot is generally in the position shown in Fig. 1. Immediately thereafter actuators 22 are activated causing support tube 20 to move upwardly and retractor arm 23 to pivot counter-clockwise about rollers 21. An upper portion of leg 14 is raised by support tube 20 and simultaneously therewith the foot, ankle, and lower portions of leg 14 are moved rearwardly to the withdrawn position shown in Figs. 2 and 3. Positive movement to the withdrawn position is assured by contact between the hook 24, which is secured to retractor arm 23, and the lower leg portion. However, as hereinbefore noted, the contact forces are kept at a minimum so as to eliminate serious physical injury to pilot 12. Continued pressures within actuator 22, and acting through retractor arm 23, restrains leg 14 in its withdrawn position.

After the ejection seat has been catapulted from the aircraft and has fallen to some pre-determined altitude, the release means provided in retractor arm 23 may be automatically actuated. See U.S. Patent Nos. 2,569,638 and 2,707,605 for teachings of pressure-sensitive devices which are selectively responsive to altitude conditions or have gas-actuated means for effecting a separation function. Preferably high-pressure gases ported through tube means 25 to the interior of barrel portion 30 cause piston 33 and pin 34 to be moved against the compression of spring 39. When pin 34 first clears lap joint 32, barrel portion 31 is freed to rotate relative thereto and compression spring 39 causes barrel portions 30 and 31 to become separated.

Thus, it is to be noted that the method and apparatus described herein provides for effective and efficient positioning and release of the leg portions of a pilot during his emergency escape from a high-performance aircraft. The positioning phase of the procedure may be accomplished with greater rapidity and with the necessary positiveness but without causing injury to the pilot. Also, the apparatus provided is compact, rugged, and has a very high degree of operational reliability.

It is to be understood that the forms of the invention herein shown and described are to be taken as preferred embodiments of the same, but that various changes in the shape and size of parts may be resorted to without departing from the spirit of the invention or the scope of the subjoined claims.

We claim:

1. In combination with an ejection seat utilized to catapult a person from an airplane, leg positioning apparatus comprising: support tube means extended transverse said seat, retractor arm means pivotally connected to said support tube means and extended forward of said seat, guide means secured to said seat and engaged with said retractor arm means, release means contained in said retractor arm means to release said retractor arm means from contact with a leg of a person otherwise restrained thereby, and actuator means connected to said support tube means and to said retractor arm means in moving relation, said actuator means raising said support tube means and pivoting said retractor arm means about said guide means simultaneously when actuated to thereby position a leg portion of the person occupying said seat.

2. In combination with an aircraft ejection seat utilized to catapult a pilot from an airplane, leg positioning apparatus comprising: support tube means oriented crosswise to said seat, retractor arm means extended forward of said seat, guide means secured to said seat and engaged with said retractor arm means, pivot means connecting said retractor arm means to said support tube means, a leg-engaging element oriented crosswise to said seat for contacting a leg of a pilot positioned in said seat, release means connecting said leg-engaging element to said retractor arm means, and actuator means connected to said support tube means and to said retractor arm means in moving relation, said actuator means pivoting said retractor arm means, said leg-engaging element, and said release means about said guide means and relative to said support tube means when raising said support tube means to thereby position a leg portion of a pilot occupying said seat.

3. An aircraft ejection seat comprising seat structure and leg positioning apparatus connected thereto, said leg positioning apparatus including: a transverse support tube means located near the forward edge of said seat structure, retractor arm means extended forward of said seat structure and having a leg-engaging element attached thereto, pivot fastener means connecting said retractor arm means to said support tube means, guide means attached to said seat structure in surrounding relation to a portion of said retractor arm means, actuator means pivotally connected to said seat structure, and pivot means connecting said actuator means in moving relation to said support tube means and to said retractor arm means, said actuator means raising said support tube means and simultaneously pivoting said retractor arm means relative to said support tube means and relative to said guide means when positioning the legs of a person occupying said seat.

4. The ejection seat defined in claim 3, wherein said retractor arm means is comprised of a first tubular portion and a separate second tubular portion, and wherein said leg positioning apparatus includes a release means connecting said first tubular portion to said second tubular portion in rigid relation, said release means having a reciprocable retention pin means contained interiorly of said tubular portion and oriented along the longitudinal axis of said tubular portions.

5. The ejection seat defined in claim 4, wherein said leg-engaging element is attached to said second tubular portion, and wherein said release means includes a compression spring means contained within said second tubular portion, said reciprocable retention pin means being continuously urged away from said second tubular portion by said compression spring means.

6. The ejection seat defined in claim 4, wherein said release means includes a piston member contained within said retractor arm means in abutting relation to said reciprocable retention pin means, said retractor arm means limiting movement of said piston member and said reciprocable retention pin means away from said leg-engaging element.

7. The ejection seat defined in claim 4, wherein said release means includes a piston member contained in said retractor arm means in abutting relation to said reciprocable retention pin means and includes a manually operable stud means, said stud member being connected to and extended transverse from said piston member and projected through said retractor arm means for manual operation in an emergency situation.

References Cited in the file of this patent

UNITED STATES PATENTS

| | | |
|---|---|---|
| 2,467,763 | Martin | Apr. 19, 1949 |
| 2,528,532 | Martin | Nov. 7, 1950 |
| 2,709,557 | Replogle et al. | May 31, 1955 |
| 2,765,130 | Replogle et al. | Oct. 2, 1956 |
| 2,815,008 | Hirt | Dec. 3, 1957 |
| 2,836,382 | Martin | May 27, 1958 |